United States Patent
Fogle (12)

(10) Patent No.: US 6,175,926 B1
(45) Date of Patent: Jan. 16, 2001

(54) PASSWORD PROTECTION FOR COMPUTER DOCKING STATION

(75) Inventor: Steven L. Fogle, Corvallis, OR (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/075,385

(22) Filed: May 8, 1998

(51) Int. Cl.$^7$ .............................. G06F 13/00; G06F 11/00
(52) U.S. Cl. ........................................... 713/202; 713/201
(58) Field of Search .................... 713/200, 201, 713/202

(56) References Cited

U.S. PATENT DOCUMENTS

| 5,283,714 | 2/1994 | Collins Tsai et al. |
| 5,721,835 | 2/1998 | Niwa et al. ............................ 395/281 |
| 5,805,801 | * 9/1998 | Holloway et al. .................... 713/201 |

FOREIGN PATENT DOCUMENTS

| 5-88083A2 | 3/1994 | (JP) .................................. G06F/1/00 |
| 8-124201 | 5/1996 | (JP) .................................. G06F/1/00 |

OTHER PUBLICATIONS

HP OmniBook 800 User's Guide excerpt, 1996 available on the internet at http://www.hp.com/go/omnibook or from Hewlett–Packard Company, Mobile Computing Division, 1000 N. E. Circle Blvd., Corvallis, Oregon 97330.

* cited by examiner

Primary Examiner—Ly V. Hua (57) ABSTRACT

Security is provided for a docking station. Within the docking station a docking password is stored. Upon a portable computer being attached to the docking station, a password stored in the portable computer is compared to the docking password. If the password stored in the portable computer is equal to the docking password, the portable computer is allowed to access the docking station. If the password stored in the portable computer is not equal to the docking password, the portable computer is prevented from accessing the docking station.

12 Claims, 6 Drawing Sheets

PASSWORD PROTECTION FOR COMPUTER DOCKING STATION

BACKGROUND

The present invention concerns docking stations for portable computers and pertains particularly to password protection for a computer docking station.

Generally a portable computer, such as a notebook computer, a laptop computer or a palm top computer, is optimized to reduce size and weight. This often requires tradeoffs, for example, in the size of the display and keyboard, as well as the number and types of ports which are implemented.

One way to increase the versatility of portable computers is to provide for a docking station. The docking station when connected to a portable computer provides for a number of different types of ports. These ports are used, for example, to drive a large monitor, communicate with various peripherals provide connection to a network, and so on. See for example, U.S. Pat. No. 5,283,714 issued to Collins Tsai, et al, for "Docking Apparatus for a Portable Computer."

The docking station may reside in a permanent location with ports connected to various devices. When "at the office" a user can take advantage of the power of a full desktop computer by connecting the portable computer to the docking station. When "on the road" the user has the advantage of a light weight and small sized personal computer.

Typically, a docking station can be accessed by any portable computer with a matching interface. This however, can allow for a weakness in security. Particularly, any portable computer which is able to dock to a docking station can gain access to networks, storage devices such as disk drives, printers, etc. which are attached to the docking station. In some environments such free access is undesirable.

One way to prevent access to a docking station is to use a mechanical lock which requires a physical key. When the docking station is not in used, the mechanical lock can be used to prevent unauthorized docking to the docking station. In order to access the locked docking station using a personal computer, a user is required to unlock the docking station using the physical key. However, some users may view this security method as inconvenient. Further, in order to use this security method it is necessary to keep track of the physical key.

SUMMARY OF THE INVENTION

In accordance with the preferred embodiment of the present invention, security is provided for a docking station. Within the docking station a docking password is stored. Upon a portable computer being attached to the docking station, a password stored in the portable computer is compared to the docking password. If the password stored in the portable computer is equal to the docking password, the portable computer is allowed to access the docking station. If the password stored in the portable computer is not equal to the docking password, the portable computer is prevented from accessing the docking station.

In the preferred embodiment, a security activation flag is also stored within the docking station. When the security activation flag is true, the docking password is used as described above. When the security activation flag is not true, no security is implemented and upon a portable computer being attached to the docking station, the portable computer is allowed to access the docking station. Likewise, when the docking password has a null value, security is not implemented and upon a portable computer being attached to the docking station, the portable computer is allowed to access the docking station.

Also in the preferred embodiment, an administrator password activation flag is stored within the docking station. When the administrator password activation flag is true, this indicates that an administrator password is to be used as the password which is compared to the docking password. When the administrator password activation flag is not true, this indicates that a user password is to be used as the password which is compared to the docking password. However, when the administrator password activation flag is not true and the user password has a null value, the administrator password is used as the password which is compared to the docking password.

The present invention allows for simple, elegant and automatic way to provide protection for a docking station. The protection does not require a user or administrator to utilize a separate password. Additionally there is no physical key of which there is a need to keep track.

DESCRIPTION OF THE PREFERRED EMBODIMENT

Figure 1:
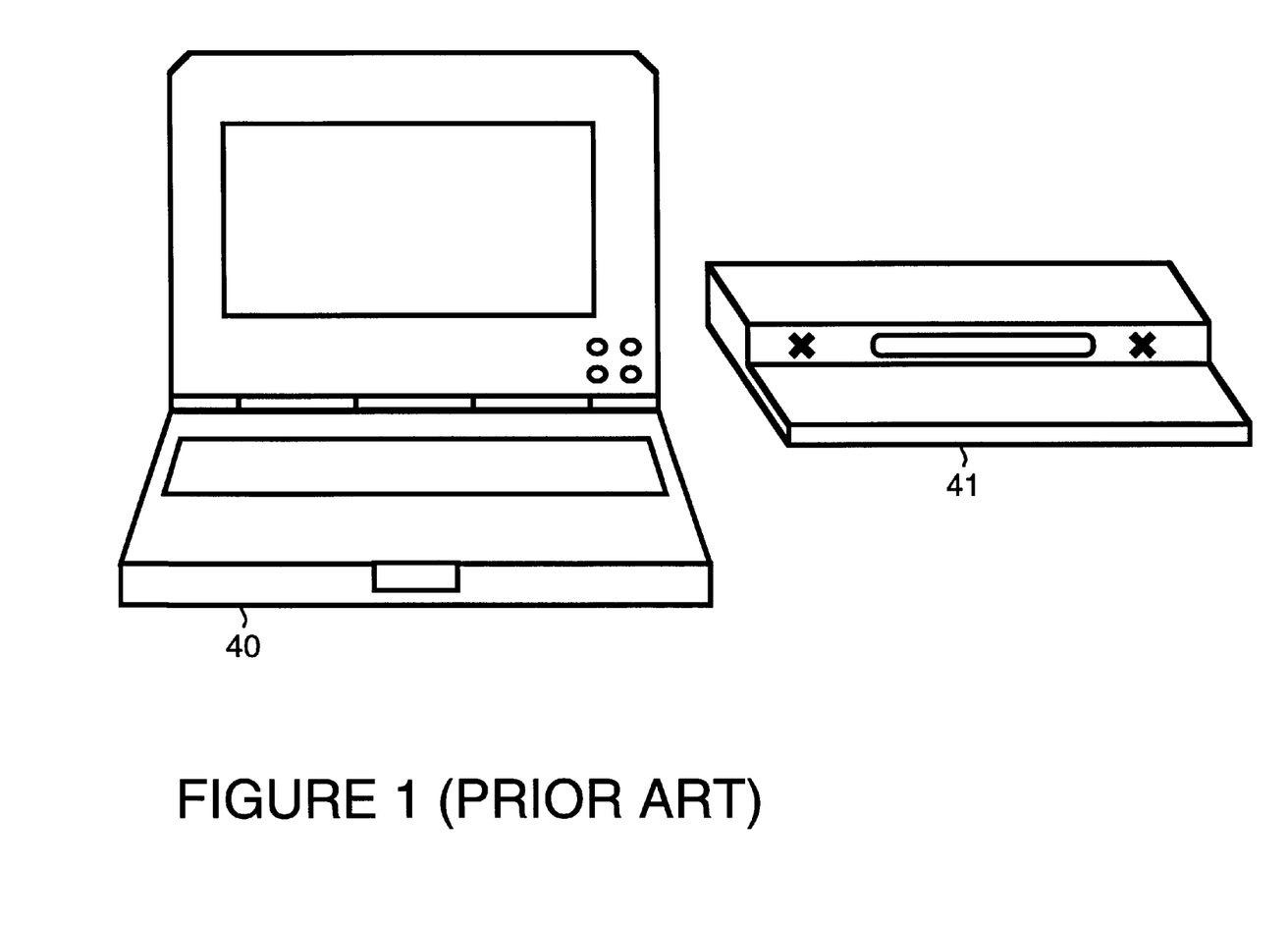
FIG. 1 is a simplified illustration of a portable computer and a docking station.

FIG. 1 shows a docking station 41 which provides for communication with a portable computer 40.

Figure 2:
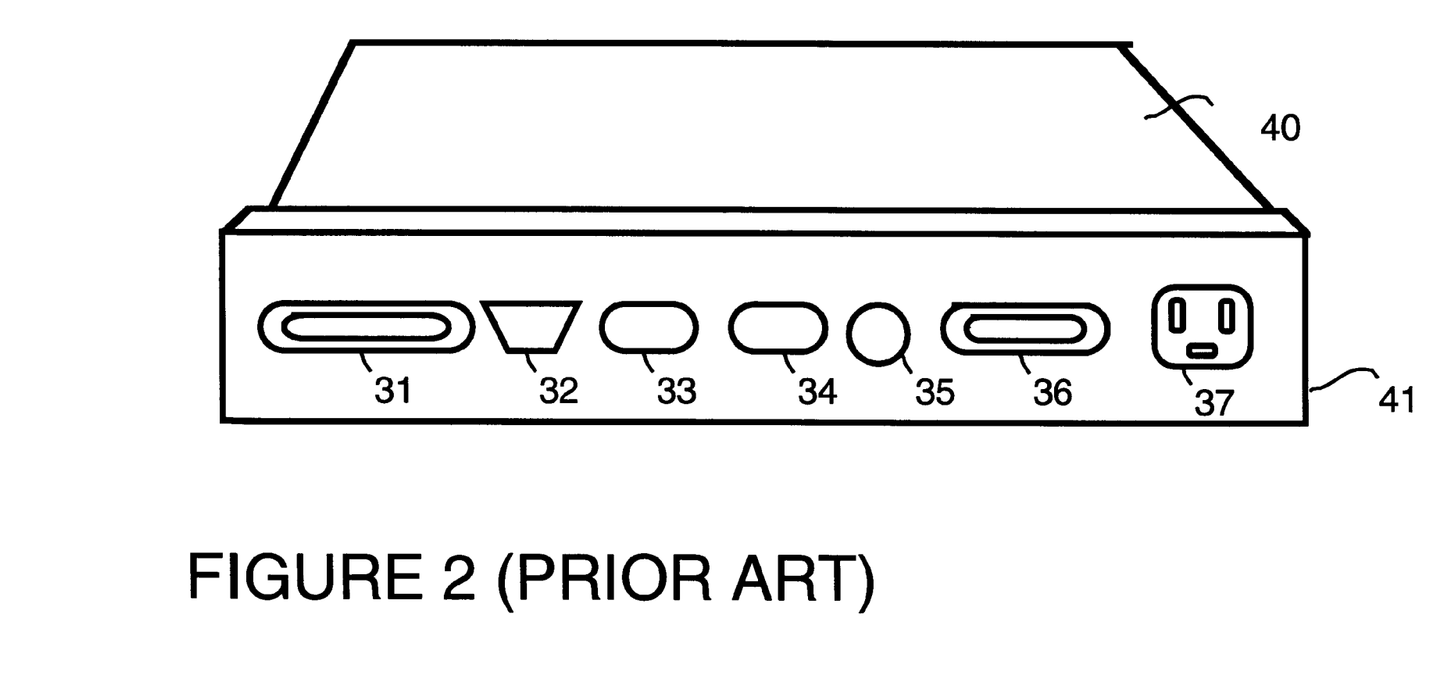
FIG. 2 is a simplified illustration which portrays the portable computer and the docking station shown in FIG. 1 in a docked position.

FIG. 2 shows portable computer 40 in a docked position with docking station 41. In FIG. 2, the back side of docking station 41 is shown to include, for various ports, a physical connector 31, a physical connector 32, a physical connector 33, a physical connector 34, a physical connector 35 and a physical connector 36. A physical connector 37 for power is also shown.

Physical connectors 31 through 36 are illustrative physical connectors for various types of ports which may include, for example, one or more serial ports, parallel ports, PS/2 ports, universal serial bus (USB) ports, network connection/port or some other combination of standard or non-standard ports used in conjunction with a personal computer.

Figure 3:
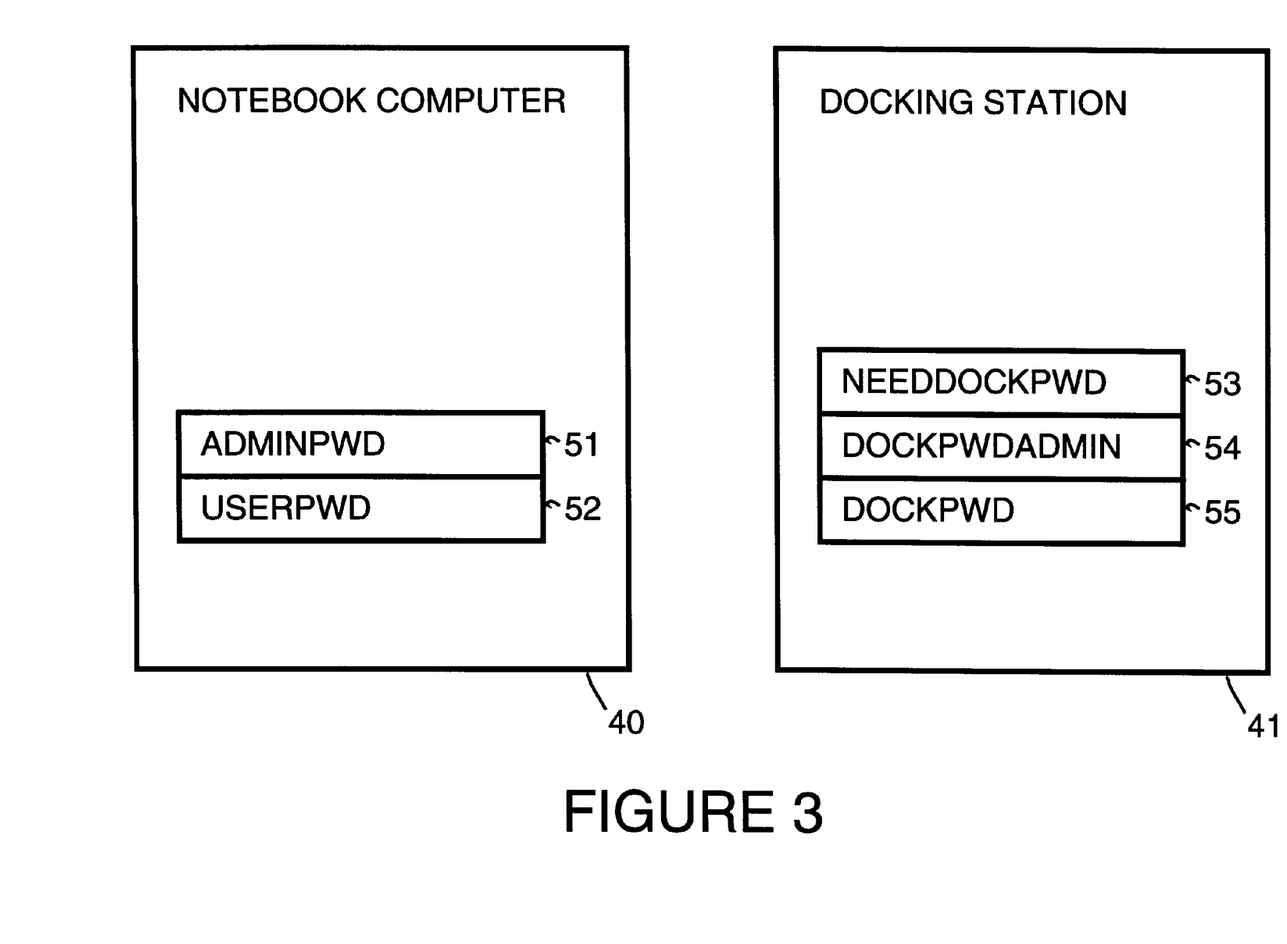
FIG. 3 is a simplified block diagram which shows various flags and passwords stored in the portable computer and the docking station shown in FIG. 1, in accordance with a preferred embodiment of the present invention.

The present invention prevents docking station 41 (and thus devices attached to physical connectors 31 through 36) from being accessed by portable computer 40 unless portable computer 40 has been authorized to use docking station 41. FIG. 3 shows various flags and passwords stored in portable computer 40 and docking station 41 in order to implement this security feature.

FIG. 3 shows an administrator (or supervisor) password (ADMINPWD) 51 and a user password (USERPWD) 52 stored in non-volatile memory (such as an EEPROM) within portable computer 40.

Administrator password 51 is used by a system administrator to protect portable computer 40 from unauthorized configuration changes by the end user. If the user of portable computer 40 is also the administrator, administrator password 51 may also be used instead of user password and user password 52 can be left blank (NULL).

User password 52 is used by the user of portable computer 40 to prevent unauthorized access to portable computer 40. For example, user password 51 must be entered into portable computer 40 before portable computer will allow access to information and programs stored on personal computer 40.

Administrator password 51 may be entered whenever user password 52 is requested. In a typical system the administrator can configure the system to require entry of administrator password 51 before allowing portable computer 40 to undock from docking station 41.

For more information on use of administrator passwords and user passwords, see for example, HP OmniBook 800 User's Guide, 1996 available on the internet at http://www.hp.com/go/omnibook or from Hewlett-Packard Company, Mobile Computing Division, 1000 N. E. Circle Blvd., Corvallis, Oreg. 97330.

While use of administrator password 51 and user password 52, as described above, protects portable computer 40 from unauthorized access and protects portable computer 40 from unauthorized removal from docking station 41, such use of administrator password 51 and user password 52 does not protect devices connected to docking station 41 from being accessed by inserting into docking station 41a different portable computer of the same kind as portable computer 40.

To prevent the unauthorized use of docking station 41, a docking password (DOCKPWD) 55 is stored in non-volatile memory (such as an EEPROM) within docking station 41. When security for docking station 41 is activated, portable computer 40 (or any other portable computer) is not allowed access to docking station 41 unless docking password 55 matches administrator password 51 or user password 52.

In the preferred embodiment, a security activation flag (NEEDDOCKPWD) 53 is stored in non-volatile memory within docking station 41. When security activation flag 53 is true, this indicates that security for docking station 41 has been activated and that no portable computer is allowed access to docking station 41 unless docking password 55 matches an administrator password or a user password stored in the portable computer, as further described below. When security activation flag 53 is false, this indicates that security for docking station 41 has been deactivated and that a portable computer can have access to docking station 41 without requiring a match for docking password 55.

Also in the preferred embodiment, an administrator password activation flag (DOCKPWDADMIN) 54 is also stored in non-volatile memory within docking station 41. When administrator password activation flag 54 is true, this indicates that when security for docking station 41 has been activated, no portable computer is allowed access to docking station 41 unless docking password 55 matches the administrator password stored in the portable computer. When administrator password activation flag 54 is false, this indicates that when security for docking station 41 has been activated, no portable computer is allowed access to docking station 41 unless docking password 55 matches the user password stored in the portable computer. In the case where the user password is null and administrator password activation flag 54 is false, no portable computer is allowed access to docking station 41 unless docking password 55 matches the administrator password stored in the portable computer.

The presence of administrator password activation flag 54 accomplishes the goal of allowing groups of portable computers to access a single shared docking station. When administrator password activation flag 54 is true, this allows any portable computer with a matching administrator password to use docking station 41. Each such portable computer is able to utilize docking station 41 while still retaining a unique user password.

Figure 4:
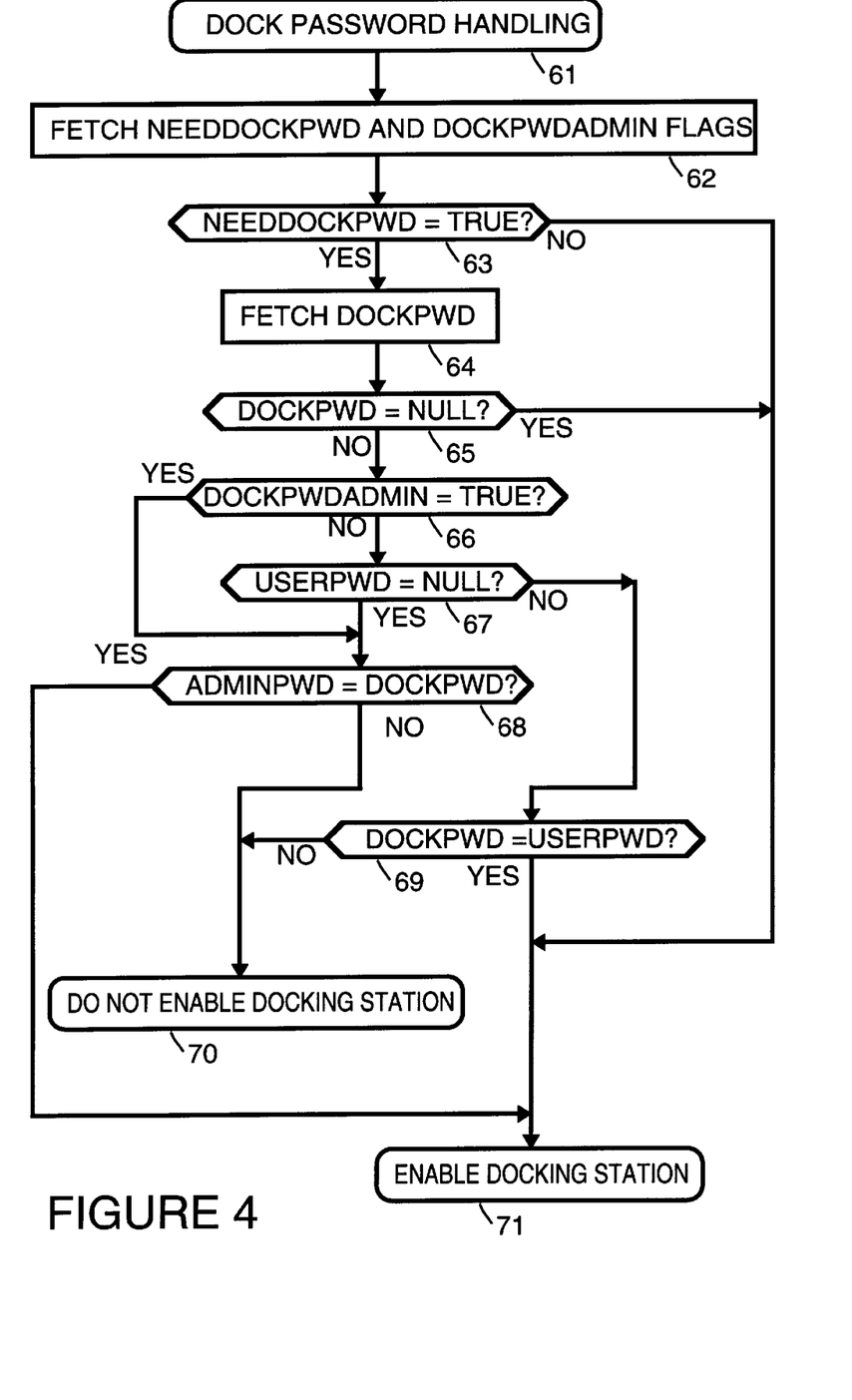
FIG. 4 is a flowchart which illustrates how the various flags and passwords stored in the portable computer and the docking station shown in FIG. 1 are used to provide security to the docking station in accordance with a preferred embodiment of the present invention.

FIG. 4 is a flowchart which illustrates how the various flags and passwords stored in portable computer 40 and docking station 41 are used to provide security to docking station 41. In the embodiment shown in FIG. 4, the described flowchart is performed in portable computer 40, for example using a processor 56 shown in FIG. 3. In an alternative embodiment of the present invention, the flowchart may be performed within docking station 41 using a processor 57 shown in FIG. 3.

The docking password handling routine is entered in a step 61. In a step 62, security activation flag (NEEDDOCKPWD) 53 and administrator password activation flag (DOCKPWDADMIN) 54 are fetched from docking station 41.

In a step 63 a check is made to see if security activation flag (NEEDDOCKPWD) 53 is true. If in step 63 security activation flag (NEEDDOCKPWD) 53 is false, in a step 71, docking station 41 is enabled.

If in step 63 security activation flag (NEEDDOCKPWD) 53 is true, in a step 64, docking password (DOCKPWD) 55 is fetched from docking station 41.

In a step 65 a check is made to see if docking password (DOCKPWD) 55 is NULL. If in step 65 docking password (DOCKPWD) 55 is NULL, in step 71, docking station 41 is enabled.

If in step 65 docking password (DOCKPWD) 55 is not NULL, in a step 66, a check is made to see if administrator password activation flag (DOCKPWDADMIN) 54 is true. If in step 66, administrator password activation flag (DOCKPWDADMIN) 54 is true, a step 67 is skipped.

If in step 66, administrator password activation flag (DOCKPWDADMIN) 54 is not true, in step 67, a check is made to see if user password (USERPWD) 52 is null. If in step 67, password (USERPWD) 52 is null, in a step 68 a check is made to see if administrator password (ADMINPWD) 51 is equal to docking password (DOCKPWD) 55.

If in step 68 administrator password (ADMINPWD) 51 is equal to docking password (DOCKPWD) 55, in step 71 docking station 41 is enabled. If in step 68 administrator password (ADMINPWD) 51 is not equal to docking password (DOCKPWD) 55, in a step 70 docking station 41 is not enabled.

If in step 67, password (USERPWD) 52 is not null, in a step 69 a check is made to see if user password (USERPWD) 52 is equal to docking password (DOCKPWD) 55.

If in step 69 user password (USERPWD) 52 is equal to docking password (DOCKPWD) 55, in step 71 docking station 41 is enabled. If in step 69 user password (USERPWD) 52 is not equal to docking password (DOCKPWD) 55, in step 70 docking station 41 is not enabled.

In order to maintain coherence between docking password 55 and an associated password within portable computer 40, when the associated password in portable computer 40 is updated, docking password 55 must be updated as well. For example, when administrator password activation flag 54 is true, when administrator password 51 is updated, then docking password 55 is updated as well. Likewise, when administrator password activation flag 54 is false, when user password 52 is updated, then docking password 55 is updated as well.

Coherence between docking password 55 and an associated password within portable computer 40 is best maintained by changing the associated password only when portable computer 40 is docked to docking station 41.

Figure 5:
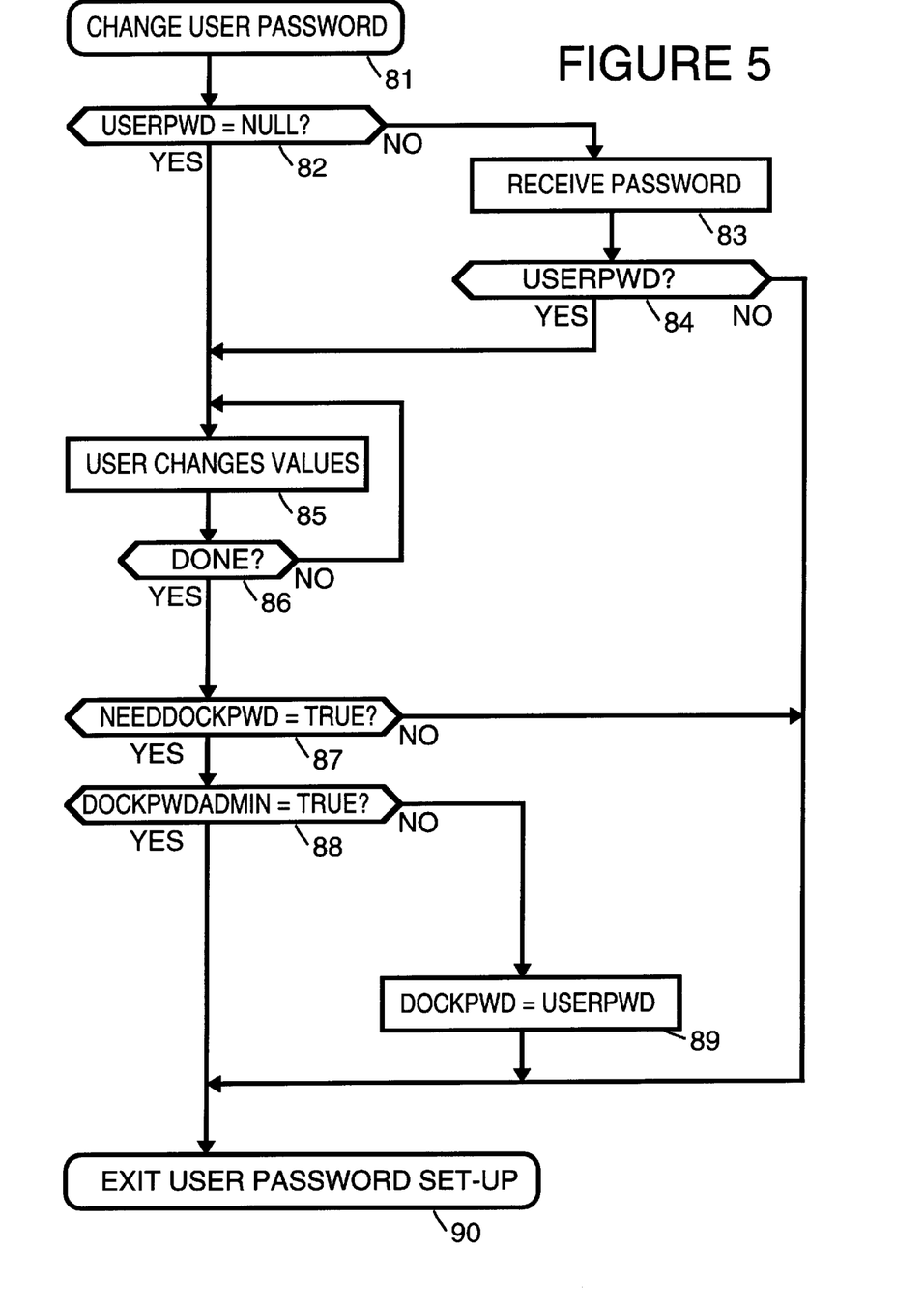
FIG. 5 and FIG. 6 are flowcharts which illustrate how the various flags and passwords stored in the portable computer and the docking station are changed in accordance with a preferred embodiment of the present invention.

FIG. 5 is a flowchart which illustrates how user password (USERPWD) 52 is changed.

The user password set-up routine is entered in a step 81. In a step 82 a check is made to see if the current value of user password (USERPWD) 52 is NULL. If not, in a step 83 a password is received from a user of the user password set-up routine. In a step 84, a check is made to see if the password received from the user is equal to user password (USERPWD) 52.

If in step 83, the password received from the user is equal to user password (USERPWD) 52, or if in step 82 the current value of user password (USERPWD) 52 is NULL, the user password set-up routine proceeds to a step 85. In step 85, the user can change the value of user password 52. As illustrated by a step 86, the user password set-up routine waits for the user to indicate changes are complete (e.g., by selecting an OK button in a user set-up window) before proceeding to a step 87.

In step 87 a check is made to see if security activation flag (NEEDDOCKPWD) 53 is true. If in step 87 security activation flag (NEEDDOCKPWD) 53 is not true, in a step 90, the user password set-up routine is exited.

If in step 87 security activation flag (NEEDDOCKPWD) 53 is true, in a step 88 a check is made to see if administrator password activation flag (DOCKPWDADMIN) 54 is true. If in step 88 administrator password activation flag (DOCKPWDADMIN) 54 is true, then in step 90, the user password set-up routine is exited.

If in step 88 administrator password activation flag (DOCKPWDADMIN) 54 is not true, in a step 89, docking password (DOCKPWD) 55 is set equal to user password (USERPWD) 52. Then in step 90, the user password set-up routine is exited.

Figure 6:
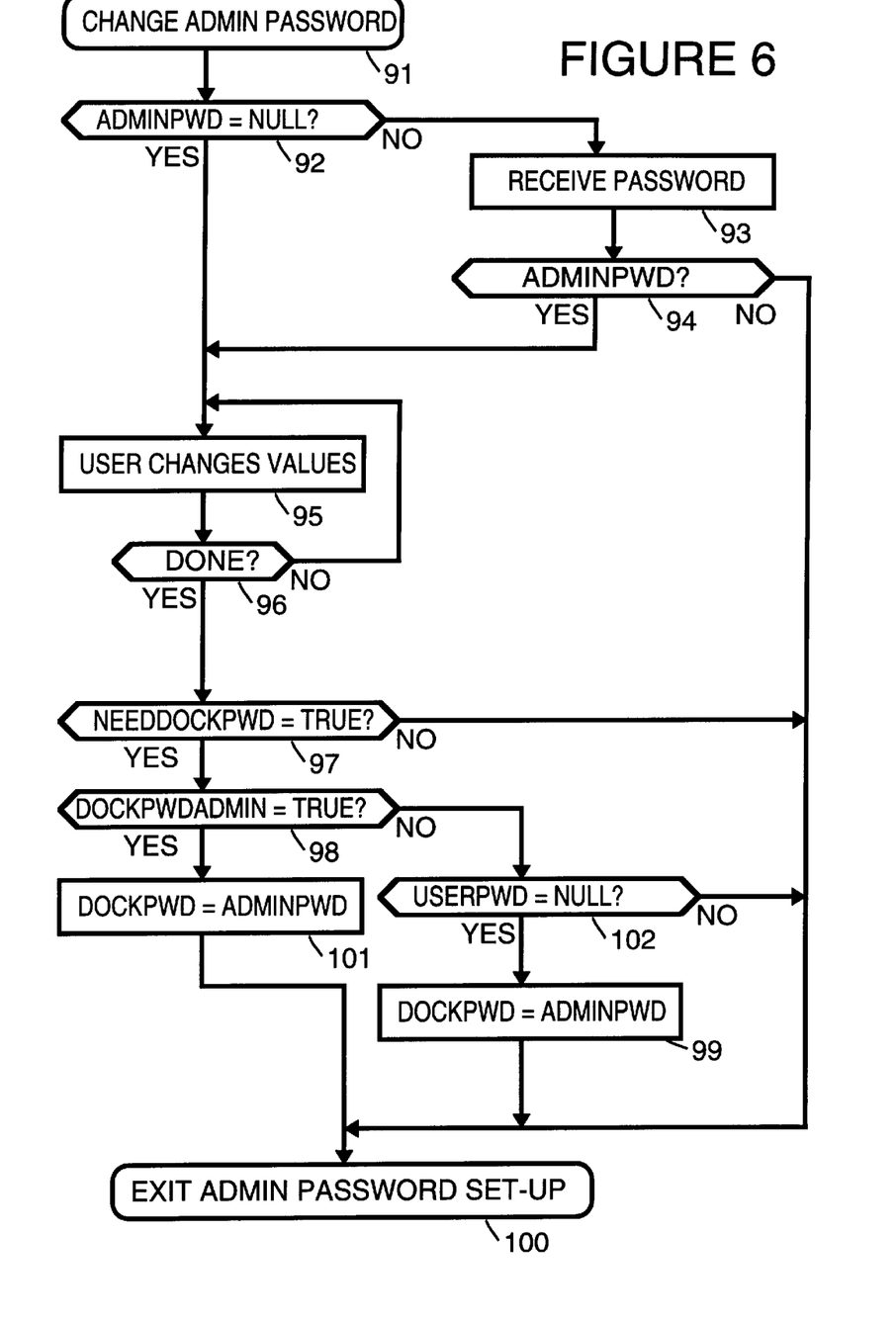

FIG. 6 is a flowchart which illustrates how administrator password (ADMINPWD) 51 is changed.

The administrator password set-up routine is entered in a step 91. In a step 92 a check is made to see if the current value of administrator password (ADMINPWD) 51 is NULL. If so, in a step 93 a password is received from a user of the administrator password set-up routine. In a step 94, a check is made to see if the password received from the user is equal to administrator password (ADMINPWD) 51.

If in step 94, the password received from the user is equal to administrator password (ADMINPWD) 51, or if in step 92 the current value of administrator password (ADMINPWD) 51 is NULL, the administrator password set-up routine proceeds to a step 95. In step 95 an administrator set-up window allows the administrator to change the values of administrator password 51, security activation flag 53 and/or administrator password activation flag 54. As illustrated by a step 96, the administrator password set-up routine waits for the administrator to indicate changes are complete (e.g., by selecting an OK button in the administrator set-up window) before proceeding to a step 97.

In step 97 a check is made to see if security activation flag (NEEDDOCKPWD) 53 is true. If in step 97 security activation flag (NEEDDOCKPWD) 53 is not true, in a step 100, the administrator password set-up routine is exited.

If in step 97 security activation flag (NEEDDOCKPWD) 53 is true, in a step 98 a check is made to see if administrator password activation flag (DOCKPWDADMIN) 54 is true. If in step 98 administrator password activation flag (DOCKPWDADMIN) 54 is true, in a step 101, docking password (DOCKPWD) 55 is set equal to administrator password (ADMINPWD) 51. Then in step 100, the administrator password set-up routine is exited.

If in step 98 administrator password activation flag (DOCKPWDADMIN) 54 is not true, in a step 102, a check is made to see if user password (USERPWD) 52 is equal to NULL. If in step 102, user password (USERPWD) 52 is equal to NULL, in a step 99 docking password (DOCKPWD) 55 is set equal to administrator password (ADMINPWD) 51. Then in step 100, the password set-up routine is exited. If in step 102, user password (USERPWD) 52 is not equal to NULL, in step 100, the password set-up routine is exited.

The foregoing discussion discloses and describes merely exemplary methods and embodiments of the present invention. As will be understood by those familiar with the art, the invention may be embodied in other specific forms without departing from the spirit or essential characteristics thereof Accordingly, the disclosure of the present invention is intended to be illustrative, but not limiting, of the scope of the invention, which is set forth in the following claims.

I claim:

1. A method for providing security to a docking station comprising the following steps:
   (a) storing a docking password within the docking station;
   (b) upon a portable computer being attached to the docking station, performing the followings substeps:
      (b.1) comparing a password stored in the portable computer to the docking password,
      (b.2) if the password stored in the portable computer is equal to the docking password, allowing the portable computer to access the docking station, and
      (b.3) if the password stored in the portable computer is not equal to the docking password, preventing the portable computer from accessing the docking station; and,
   (c) storing an administrator password activation flag within the docking station;
      wherein substep (b.1) includes the followings substeps:
         (b.1.1) using an administrator password as the password which is compared to the docking password when the administrator password activation flag is true, and
         (b.1.2) using a user password as the password which is compared to the docking password when the administrator password activation flag is not true.

2. A method as in claim 1 additionally comprising the following steps:
   (d) storing a security activation flag within the docking station;
      wherein step (b) is performed when the security activation flag is true; and, wherein when the security activation flag is not true, performing the following step instead of step (b):

(e) upon a portable computer being attached to the docking station, allowing the portable computer to access the docking station.

3. A method as in claim 1 wherein in substep (b.1.2), when the administrator password activation flag is not true and the user password has a null value, using the administrator password as the password which is compared to the docking password.

4. A method as in claim 1 wherein when in step (a) the docking password has a null value, performing the following step instead of step (b):

(d) upon a portable computer being attached to the docking station, allowing the portable computer to access the docking station.

5. Storage media which stores a software program which, when executed, performs a method comprising the following step:

(a) upon a portable computer being attached to a docking station, performing the followings substeps:
  (a.1) obtaining a docking password stored in the docking station,
  (a.2) comparing a password stored in the portable computer to the docking password,
  (a.3) if the password stored in the portable computer is equal to the docking password, allowing the portable computer to access the docking station, and
  (a.4) if the password stored in the portable computer is not equal to the docking password, preventing the portable computer from accessing the docking station;
  wherein substep (a.1) comprises the following substep:
    (a.1.1) obtaining an administrator password activation flag from within the docking station; and,
  wherein substep (a.2) includes the followings substeps:
    (a.2.1) using an administrator password as the password which is compared to the docking password when the administrator password activation flag is true, and
    (a.2.2) using a user password as the password which is compared to the docking password when the administrator password activation flag is not true.

6. Storage media as in claim 5 wherein in substep (a.2.2), when the administrator password activation flag is not true and the user password has a null value, using the administrator password as the password which is compared to the docking password.

7. Storage media as in claim 5 wherein substep (a.1) additionally comprises the following substeps:
  (a.1.2) obtaining a security activation flag from within the docking station; and,
  (a.1.3) when the security activation flag is true proceeding to perform substep (a.2), substep (a.3) and substep (a.4);

wherein when the security activation flag is not true, performing the following substep instead of substep (a.2), substep (a.3) and substep (a.4):
  (a.5) allowing the portable computer to access the docking station.

8. Storage media as in claim 5 wherein when in substep (a.1) the docking password has a null value, performing the following substep instead of substep (a.2), substep (a.3) and substep (a.4):
  (a.5) allowing the portable computer to access the docking station.

9. A docking station comprising:

storage means for storing a docking password within the docking station; and, protection means for, upon a portable computer being attached to the docking station, comparing a password stored in the portable computer to the docking password, the protection means allowing the portable computer to access the docking station when the password stored in the portable computer is equal to the docking password, and the protection means preventing the portable computer from accessing the docking station when the password stored in the portable computer is not equal to the docking password;

wherein the storage means is additionally for storing an administrator password activation flag within the docking station;

wherein the protection means uses an administrator password as the password which is compared to the docking password when the administrator password activation flag is true; and, wherein the protection means uses a user password as the password which is compared to the docking password when the administrator password activation flag is not true.

10. A docking station as in claim 9, when the administrator password activation flag is not true and the user password has a null value, the protections means uses the administrator password as the password which is compared to the docking password.

11. A docking station as in claim 10 wherein when the docking password has a null value, the protection means allows the portable computer to access the docking station without comparing the password stored in the portable computer to the docking password.

12. A docking station as in claim 9:

wherein the storage means is additionally for storing a security activation flag within the docking station; and, wherein when the security activation flag is not true the protection means allows the portable computer to access the docking station without comparing the password stored in the portable computer to the docking password.

* * * * *